Patented May 22, 1923.

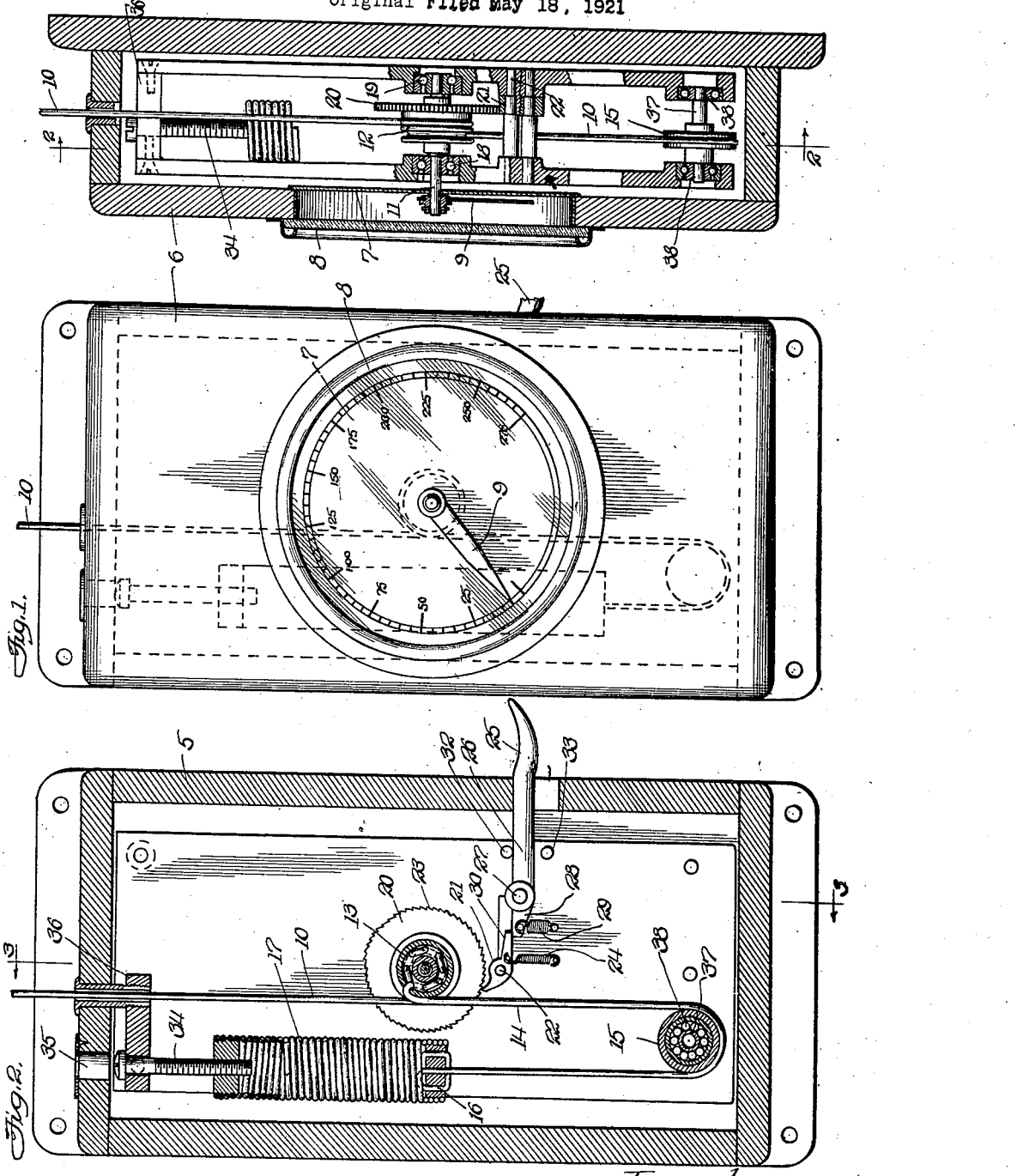

1,456,310

UNITED STATES PATENT OFFICE.

NOAH S. HARTER, OF WAUKEGAN, ILLINOIS, ASSIGNOR OF ONE-THIRD TO A. T. WEAVER AND ONE-THIRD TO GEORGE F. RUMMEL, BOTH OF CHICAGO, ILLINOIS.

INDICATOR.

Application filed May 18, 1921, Serial No. 470,570. Renewed April 14, 1923.

*To all whom it may concern:*

Be it known that I, NOAH S. HARTER, a citizen of the United States, residing at Waukegan, in the county of Lake and State of Illinois, have invented certain new and useful Improvements in Indicators, of which the following is a specification.

The invention relates to improvements in Indicators.

One of the objects of the invention is to improve recorders.

Another object is to provide an impulse recorder which will record the maximum effect of the impulse.

Another object is to provide a recorder which will impose minimum resistance upon the associate means for producing the impulse.

Another object is to provide an accurate, durable and reliable indicating device.

Another object is to provide an indicating device that may be associated with a suitable target, to indicate the force and effect of a blow delivered to a golf ball in a practice game, more specifically disclosed in my copending application Ser. No. 470,569, filed May 18, 1921.

Other, further and more specific objects of the invention will become readily apparent, to persons skilled in the art, from a consideration of the following description when taken in conjunction with the drawings, wherein:—

Fig. 1 is a front view of the indicator embodying my invention.

Fig. 2 is a section taken approximately on line 2—2 of Fig 3.

Fig. 3 is a section taken approximately on line 3—3 of Fig. 2.

In all of the views the same reference characters are employed to indicate similar parts.

The indicator is contained within the casing 5 having a hinged top 6 in the center of which is a dial 7 under a glass front 8 thru which the index or pointer 9 may be seen. The dial is graduated and bears on its face numerals indicative of the number of yards a golf ball would be driven by an impact necessary to move the pointer 9 to the point corresponding with the respective indication, or in other words, the dial is, or may be, graduated to represent the relative impact or effect of an impulse that may be applied to a cord or line 10, the movement of which is effective to rotate the pointer 9.

The pointer 9 is fixed to a transverse shaft 11 which bears a drum 12 around which the cord or line 10 is wound and to which it is fixed by interweaving the cord inside of the drum 12 so that the end 14 passing around the pulley 15 may be secured to the lower end 16 of a spring 17. The shaft 11 is preferably supported in ball bearings 18 and 19 to reduce its resistance to rotation to a minimum.

The shaft 11 also bears a ratchet wheel 20 in normal engagement with which is a spring stressed pawl 21 supported on a transverse shaft 22 which is held yieldingly in contact with the teeth 23 of the wheel 20 by means of the spring 24. The pawl 21 may be disengaged from the wheel by a downward pressure upon the outer end 25 of the pivoted lever 26, which lever is pivoted at 27, and has a short end 28, held downwardly by the spring 29, and which engages the end 30 of the pawl 21. Stops 32 and 33 limit the movements of the lever 26.

Now, from the foregoing description, it will be manifest that when a pull is exerted on the cord 10, the drum 13 on the shaft 11 will be rotated in proportion to the stress applied to the cord. The spring 17 will resist the pull or stress applied to the cord 10 and will permit the drum 13 and the pointer 9 to be rotated proportionately to the effect of the stress applied to the cord. The pawl 21, engaging the wheel 20, will hold the pointer 9 in the position to which it has been rotated after cessation of the applied force that moves it to that point.

After the impulse has been applied to the cord and the pointer moved on the dial by the effect thereof, observation is made of the recorder, and the pointer or index is released when it will be automatically returned to its normal position by effect of the spring 17. To release the pawl, it is only necessary to press down upon the end 25 of the pivoted handle 26, whereupon the inner end 28, engaging the end 30 of the pawl will move the pawl out of engagement with the teeth 23, thereby permitting the index, or pointer 9, to return to the zero position.

The effect of the spring 17 may be varied by means of the adjusting screw 34 to bring the pointer back to zero, the spring having previously been properly calibrated with respect to the pointer and the dial 7 over which it moves. The screw 34 is accessible at any time thru an orifice 35 made in the end of the casing 5. The mechanism described is contained in a frame 36 properly secured to the casing.

The wheel 15 around which the cord 10 passes is shown supported upon a shaft 37 in ball bearings 38.

While the device described is well adapted for the purpose heretofore mentioned, it also may be used for other purposes for permanently recording the maximum effect of stress applied to the cord whether it be a single impulse or a prolonged pull.

While I have herein shown a single embodiment of my invention and mentioned a special use to which it is readily adaptable, it will be manifest to persons skilled in the art, that a number of changes may be made in the general arrangement and configuration of the parts and its uses may be varied within the scope of the appended claim.

Having described my invention what I claim as new and desire to secure by Letters Patent, is:—

An indicator having a casing; a rotatable drum therein; a ratchet wheel in the casing and an index outside the casing rotatable with the drum; a closed coil spring within the casing having one end adjustably fixed; a cord extending into the casing, wound about the drum, secured thereto and extended therefrom into contact with the free end of the spring; a pawl yieldingly bearing on said ratchet wheel; a lever to release the pawl extending outside the casing; and means accessible thru a fixed wall of the casing to adjust the tension of the spring.

In testimony whereof I hereunto subscribed my name.

NOAH S. HARTER.